(12) United States Patent
Houri (10) Patent No.: US 7,397,424 B2
(45) Date of Patent: Jul. 8, 2008

(54) SYSTEM AND METHOD FOR ENABLING CONTINUOUS GEOGRAPHIC LOCATION ESTIMATION FOR WIRELESS COMPUTING DEVICES

(75) Inventor: Cyril Houri, New York, NY (US)

(73) Assignee: Mexens Intellectual Property Holding, LLC, New York, NY (US)

( * ) Notice: Subject to any disclaimer, the term of this patent is extended or adjusted under 35 U.S.C. 154(b) by 56 days.

(21) Appl. No.: 11/170,337

(22) Filed: Jun. 29, 2005

(65) Prior Publication Data

US 2006/0170591 A1    Aug. 3, 2006

Related U.S. Application Data

(60) Provisional application No. 60/649,180, filed on Feb. 3, 2005.

(51) Int. Cl.
  G01S 5/14 (2006.01)
  G01C 21/00 (2006.01)
  H04Q 7/20 (2006.01)

(52) U.S. Cl. .............. 342/357.14; 701/200; 701/213; 455/456.1

(58) Field of Classification Search ........... 342/357; 455/67; 701/200
  See application file for complete search history.

(56) References Cited

U.S. PATENT DOCUMENTS

| | | | |
|---|---|---|---|
| 5,185,860 A | | 2/1993 | Wu |
| 5,675,741 A | | 10/1997 | Aggarwal et al. |
| 5,835,720 A | | 11/1998 | Nelson et al. |
| 5,918,181 A | * | 6/1999 | Foster et al. ............. 455/456.1 |
| 5,944,790 A | | 8/1999 | Levy |
| 5,948,055 A | | 9/1999 | Pulsipher et al. |
| 5,948,061 A | | 9/1999 | Merriman et al. |
| 6,047,234 A | * | 4/2000 | Cherveny et al. ........... 701/200 |
| 6,151,631 A | | 11/2000 | Ansell et al. |
| 6,289,341 B1 | | 9/2001 | Barney |
| 6,377,987 B1 | | 4/2002 | Kracht |
| 6,412,014 B1 | | 6/2002 | Ryan |
| 6,425,007 B1 | | 7/2002 | Messinger |

(Continued)

OTHER PUBLICATIONS

Place Lab: Device Positioning Using Radio Beacons in the Wild, by Anthony LaMarca et al., Pervasive 2005, Munich, Germany.

(Continued)

*Primary Examiner*—Thomas H. Tarcza
*Assistant Examiner*—Harry Liu
(74) *Attorney, Agent, or Firm*—Brian Roffe (57) ABSTRACT

System and method for enabling a wireless computing device to continuously determine its position includes a wireless computing device and a wireless positioning system substantially collocated therewith. The wireless positioning system has a first positioning mode in which it communicates with a wireless positioning network to enable the geographic location of the computing device to be determined upon reception of signals from the positioning network and a second positioning mode in which it enables the geographic location of the wireless computing device to be determined upon reception of signals from one or more of the wireless beacons and analysis of the signals in light of positional information about wireless beacons contained in a database. The wireless positioning system switches between the positioning modes depending on reception of signals from the wireless positioning network.

27 Claims, 3 Drawing Sheets

U.S. PATENT DOCUMENTS

| | | | |
|---|---|---|---|
| 6,507,869 B1 | 1/2003 | Franke et al. | |
| 6,508,710 B1 | 1/2003 | Paravia et al. | |
| 6,665,715 B1 | 12/2003 | Houri | |
| 6,847,892 B2* | 1/2005 | Zhou et al. | 701/213 |
| 7,000,015 B2* | 2/2006 | Moore et al. | 709/224 |
| 2003/0069693 A1* | 4/2003 | Snapp et al. | 701/213 |
| 2004/0087317 A1* | 5/2004 | Caci | 455/456.1 |
| 2004/0174297 A1* | 9/2004 | Cho | 342/357.14 |
| 2004/0214550 A1* | 10/2004 | Jenkins | 455/403 |
| 2004/0230370 A1* | 11/2004 | Tzamaloukas | 701/200 |
| 2004/0230374 A1* | 11/2004 | Tzamaloukas | 701/217 |
| 2005/0105600 A1* | 5/2005 | Culum et al. | 375/150 |
| 2005/0135292 A1* | 6/2005 | Graumann | 370/328 |
| 2005/0136845 A1* | 6/2005 | Masuoka et al. | 455/67.14 |
| 2005/0227689 A1* | 10/2005 | Jewett | 455/433 |
| 2005/0278756 A1* | 12/2005 | Bodlaender | 725/89 |
| 2005/0278758 A1* | 12/2005 | Bodlaender | 725/89 |
| 2005/0282558 A1* | 12/2005 | Choi et al. | 455/456.1 |
| 2006/0170591 A1* | 8/2006 | Houri | 342/357.14 |
| 2006/0224319 A1* | 10/2006 | Rogers | 701/213 |

OTHER PUBLICATIONS

Challenge: Ubiquitous Location-Aware Computing and the "Place Lab" Initiative, by Bill N. Schilit et al., Proceedings of the First ACM International Workshop on Wireless Mobil.

A Case Study in Building Layered DHT Applications, by Yatin Chawathe et al., Jan. 2005.

Accuracy Characterization for Metropolitan-scale Wi-Fi Localization, by Yu-Chung Cheng et al., Proceedings of Mobisys 2005, Jan. 2005.

Social Disclosure of Place: From Location Technology to Communication Practices, by Iam Smith et al., Pervasive 2005, Munich, Germany.

Privacy and Security in the Location-enhanced World Wide Web, by Jason I. Hong et al., Proceeding s of Ubicomp 2003, Seattle, WA, Oct. 2003.

* cited by examiner

SYSTEM AND METHOD FOR ENABLING CONTINUOUS GEOGRAPHIC LOCATION ESTIMATION FOR WIRELESS COMPUTING DEVICES

CROSS REFERENCE TO RELATED APPLICATION

This application claims priority under 35 U.S.C. §119(e) of U.S. provisional patent application Ser. No. 60/649,180 filed Feb. 3, 2005, the specification of which is incorporated by reference herein.

FIELD OF THE INVENTION

The present invention relates generally to a system and method for enabling a wireless computing device to determine its position using a wireless positioning network, e.g., a satellite-based positioning system, irrespective of the reception of positioning signals from the wireless positioning network by the computing device.

The present invention also relates to a system and method for passively building a database of wireless beacons by means of wireless computing devices equipped with positioning systems and disseminating the database to other computing devices.

The present invention also relates to a system and method ascertaining the geographical locations of wireless computing devices based on a database of wireless beacons and a system and method for creating the database of wireless beacons.

BACKGROUND OF THE INVENTION

As portable wireless computing devices proliferate, there is a growing demand to continuously and accurately know the geographic location of the computing devices. There are basically two different ways to determine the geographic locations of a computing device, either using a wireless positioning network such the GPS system or using a database of wireless beacons and determining position using this database.

The first technique suffers from the difficulty in continuously obtaining signals, e.g., from a network of satellite, to enable the position of the computing device to be determined. It is recognized that such difficulties commonly arise in enclosed areas and confined areas, such as in areas with a large concentration of tall buildings and in tunnels.

The second technique requires the creation of a database of wireless beacons, and the computing device to be within range of a plurality of such wireless beacons. In the absence of wireless beacons within range, the position of the computing device cannot be determined.

For the second technique, several systems are being used to enable wireless computing devices to determine their position. One such system is Place Lab. Place Lab is software providing low-cost, easy-to-use device positioning for location-enhanced computing applications. The Place Lab approach is to allow wireless computing devices such as notebook computers, PDAs and cell phones, to locate themselves by listening for radio beacons such as 802.11 access points, GSM cell phone towers, and fixed Bluetooth devices that exist in the surrounding environment. These beacons all have essentially unique identifications, for example, a MAC address. The devices compute their own location by hearing one or more IDs, looking up the associated beacons' positions in a stored map, and estimating their own position referenced to the beacons' positions. Additional information about Place Lab is found in: Place Lab: Device Positioning Using Radio Beacons in the Wild, by Anthony LaMarca et al., Pervasive 2005, Munich, Germany; Challenge: Ubiquitous Location-Aware Computing and the "Place Lab" Initiative, by Bill N. Schilit et al., Proceedings of The First ACM International Workshop on Wireless Mobile Applications and Services on WLAN (WMASH 2003), San Diego, Calif. September 2003; A Case Study in Building Layered DHT Applications, by Yatin Chawathe et al., January 2005; Accuracy Characterization for Metropolitan-scale Wi-Fi Localization, by Yu-Chung Cheng et al., Proceedings of Mobisys 2005, January 2005; Social Disclosure of Place: From Location Technology to Communication Practices, by Ian Smith et al., Pervasive 2005, Munich, Germany; and Privacy and Security in the Location-enhanced World Wide Web, by Jason I. Hong et al., Proceedings of Ubicomp 2003, Seattle, Wash. October 2003.

Another positioning system is that of Skyhook Wireless which uses a database of known Wi-Fi access points to calculate the precise location of any Wi-Fi enabled device. For this system, known Wi-Fi networks are mapped, e.g., by having hired drivers travel every street in a neighborhood, and a user's location is calculated based on the Wi-Fi networks the Wi-Fi enabled device detects at a given moment using proprietary software. If the device can identify three networks, it can determine its position, e.g., using triangulation. The more networks the device detects simultaneously, the more accurate the locational fix.

It would be desirable to provide a single positioning system for a wireless computing device which is capable of continuously determining the position of the wireless computing device using both a wireless positioning network and a database of wireless beacons to enable optimum positional determination.

OBJECTS AND SUMMARY OF THE INVENTION

It is an object of the present invention to provide a new system and method for enabling a wireless computing device to determine its position using a wireless and/or satellite-based positioning system irrespective of the reception of positioning signals therefrom by the computing device.

It is yet another object of the present invention to provide a new system and method for geographically locating wireless computing devices using signals broadcast by wireless beacons.

It is still another object of the present invention to provide a new system and method for passively building a database of wireless beacons by means of wireless computing devices equipped with positioning systems and disseminating the database to other computing devices.

Still another object of the present invention is to provide a new system and method ascertaining the geographical locations of wireless computing devices based on a database of wireless beacons and a system and method for creating the database of wireless beacons.

In order to achieve one of the above objects and others, a system for enabling a wireless computing device to continuously determine its position in accordance with the invention includes a wireless computing device and a wireless positioning system substantially collocated therewith. The wireless positioning system has a first positioning mode in which it communicates with a wireless positioning network to enable the geographic location of the wireless computing device to be determined upon reception of signals from the wireless positioning network and a second positioning mode in which it enables the geographic location of the wireless computing device to be determined upon reception of signals from one or more of the wireless beacons and analysis of the signals in light of positional information about wireless beacons contained in a database. The wireless positioning system switches between the first and second positioning modes to obtain a determination of its geographic location depending on reception of signals from the wireless positioning network. Since the locational information in the first positioning mode, i.e., that from the wireless positioning network, is more accurate, when such information is available it is used and when unavailable, a database-derived location is provided. The switch may be implemented as a software-switch.

In the second positioning mode, the wireless beacons provide identification information which is associated with data about the strength of a signal therefrom and received by the wireless computing device. This identification and signal strength data is input into a calculation algorithm which determines the geographic location of the wireless computing device therefrom, the identification information being used to obtain positional information about the wireless beacons which is contained in the database.

To create the database, particularly constructed wireless computing devices are used. Specifically, the wireless computing devices is provided with a scanner arranged to communicate with the wireless positioning network to enable its geographic location to be determined upon reception of signals from the wireless positioning network, for example, coupled to a GPS device. The scanner then obtains positional information about itself and identification and signal strength information about wireless beacons in order to derive the geographic location of the wireless beacons for inclusion in the database, using a calculation algorithm. In particular, software in the scanner analyzes the strength of signals received from the wireless beacons at a plurality of different positions of the scanner and applies an algorithm to determine the position of the wireless beacons therefrom.

A method for enabling a wireless computing device to continuously determine its position in accordance with the invention involves coupling the wireless computing device to a wireless positioning network to enable the geographic location of the wireless computing device to be determined upon reception of signals from the wireless positioning network, providing a database of identification and positional information about wireless beacons and enabling the geographic position of the wireless computing device to be continuously determined by obtaining a position signal derived from the signals from the wireless positioning network upon reception thereof and in the absence of reception of usable signals from the wireless positioning network, deriving a position signal from reception of signals from wireless beacons detected by the wireless computing device and analysis of the received signals using the database. The database is constructed by obtaining identification and signal strength data about each wireless beacon at a plurality of locations at which a signal from that wireless beacon is being received and applying an algorithm to determine positional information about the wireless beacons based on the signal strength data.

A method for administering a database of wireless beacons in accordance with the invention entails maintaining a central database of wireless beacons, providing the central database to a plurality of wireless computing devices, enabling each wireless computing device to determine identification and positional information about wireless beacons not contained in the central database, periodically forwarding the identification and positional information about wireless beacons not contained in the central database from the wireless computing devices to the central database, updating the central database to include the forwarded identification and positional information, and periodically directing the updates of the central database to the plurality of wireless computing devices. Each wireless computing device can be designed to determine identification and positional information about wireless beacons as described above with respect to use of the scanner.

A related embodiment of the invention is a system for enabling a wireless computing device to continuously determine its position in which a central database is provided containing identification and positional information about wireless beacons and receives identification and positional information about wireless beacons not previously contained therein and generates database updates based thereon. Wireless computing devices each include a local database containing positional information about wireless beacons and wirelessly communicate with the central database to receive the database updates and add the database updates to the local database. A wireless positioning system is substantially collocated with each wireless computing device and enable the geographic location of the wireless computing device to be determined upon reception of signals from at least one wireless beacon and analysis of the signals in light of the positional information about wireless beacons contained in the local database. This location determination can be performed in any of the ways described above.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
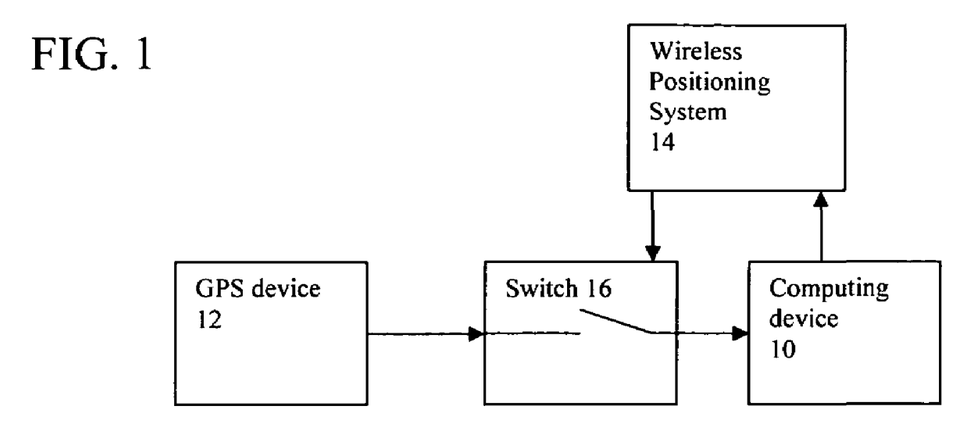
FIG. 1 is a schematic of a general concept used in the invention for enabling position of a wireless computing device to be determined.

Referring first to FIG. 1, to provide a system and method for enabling a wireless computing device to determine its position using a wireless and/or satellite-based positioning system irrespective of the reception of positioning signals therefrom by the computing device, each computing device 10 is coupled to a wireless or satellite-based positioning systems such as a GPS device 12 such that the computing device 10 and GPS device 12 are effectively collocated. Using positional data provided by the GPS device 12 and data about wireless beacons, Wi-Fi access points, cell phone towers or other comparable systems (hereinafter referred to as beacons) within reception range of the computing device 10, the computing device 10 creates a database of wireless beacons within a wireless positioning system 14 including the geographic location of each beacon (the exact manner in which such a database is formed is described below).

A software switch 16 is interposed between the GPS device 12 and the computing device 10 to vary the manner in which a determination by the computing device 10 of its position is made. Specifically, when the GPS device 12 receives an accurate positioning signal, switch 16 would allow this GPS signal to be directed to the computing device 10 so that the computing device would consider its position that determined by the GPS signal. On the other hand, when the GPS device 12 is unable to provide an accurate GPS signal, switch 16 would allow a positioning signal derived from the wireless positioning system 14, and based on input from the computing device 10 at that time, to be directed to the computing device 10 and the computing device 10 would consider its position that indicated by this positioning signal.

Switch 16 would operate to revert back to allowing a GPS signal from GPS device 12 to be directed to computing device 10 once GPS device 12 provides an accurate GPS signal. Accuracy of the GPs signal can be made in a manner known to those skilled in the art.

Accordingly, the computing device 10 would be able to continuously know its position even in the absence of an accurate GPS signal. The computing device 10 could be designed to indicate the source of its positioning signal, e.g., an icon on a screen thereof could indicate either a satellite-derived signal (a signal from GPS device 12) or a database-derived signal (a positioning signal from wireless positioning system 14).

Although represented as separate elements in FIG. 1, this is for the purposes of explanation only and it should be understood that computing device 10 can include wireless positioning system 14 and switch 16 can be software implemented in the computing device 10. Moreover, GPS device 12 can also be incorporated into the computing device 10 so that a single hand-held or portable unit could include the entire system in accordance with this embodiment of the invention.

The database of wireless beacons in wireless positioning system 14 can be considered a map which associates the fixed physical location of each wireless beacon, i.e., where they are geographically located, with a unique or semi-unique identification code of each wireless beacon. The location of each beacon can be expressed, for example, by latitude and longitude, or possibly by another coordinate system.

Construction of such a map may be accomplished in a variety of ways, the simplest but most labor intensive being to place a positioning device, e.g., a GPS device, at the same location of each wireless beacon to thereby obtain the physical location of the wireless beacon from the GPS device. This however is highly impractical in view of the constant addition of wireless beacons and the manpower that would be required.

A preferred and far simpler method would be to collect data about each wireless beacon based on information about the strength of a signal provided by each wireless beacon at a plurality of locations at which a signal from that wireless beacon is being received. Basically, the geographic location of each wireless beacon is determined based on analysis of the signal strength provided by that wireless beacon as a function of geographic location.

Figure 2:
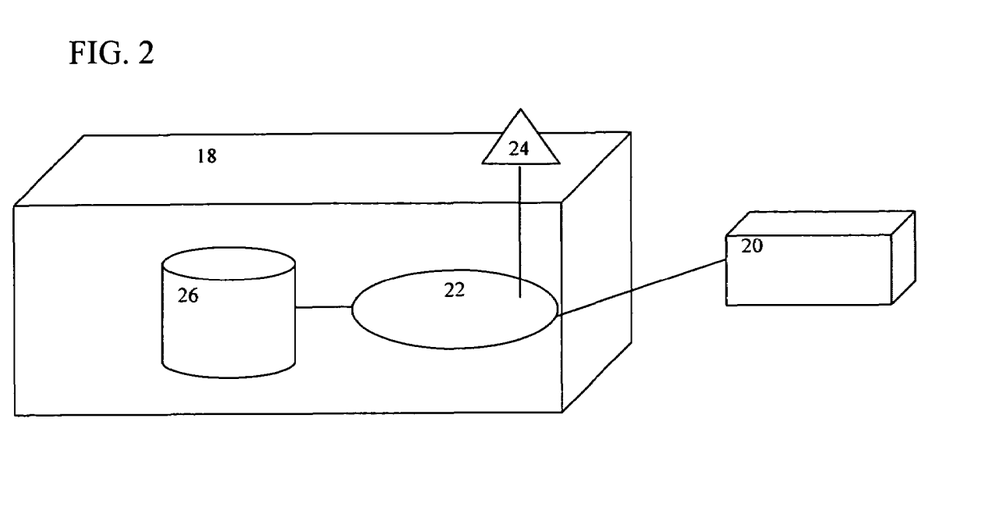
FIG. 2 is a schematic showing a scanner used to create a database of wireless beacons in accordance with the invention.

To enable such an analysis, a scanner 18 is equipped or collocated with a GPS device 20 and during movement of the scanner 18, a series of readings consisting of the position of the scanner 18, obtained using the GPS device 20, and the strength of the signal received at this position are obtained from a wireless beacon (see FIG. 2). The scanner 18 may be a hand-held computing device such as a PDA or cell phone including a processor having software 22 designed to analyze the signal received via an antenna 24 from every single beacon at different positions and estimate a geographic location thereof. A series of readings for each beacon will be stored in a database 26. Thus, if multiple beacons are being mapped, there will be multiple series of readings.

Figure 3:
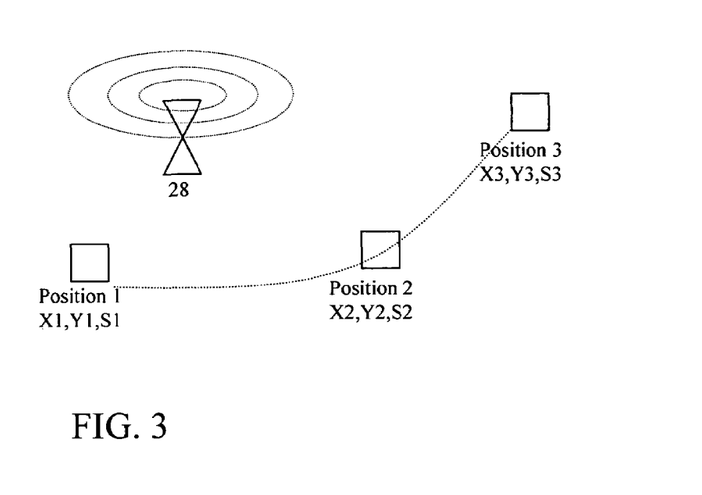
FIG. 3 is an illustration of multiple scanner readings obtained to create the database of wireless beacons.

Referring to FIG. 3, these readings will look like a series of data sets designated (Xi, Yi, Si) where Xi and Yi are the latitude and longitude, respectively, of the position of the scanner 18 and Si is the strength of a signal received at this position from wireless beacon 28. With the scanner 18 at position P1, a reading of (X1,Y1,S1) is obtained, with the scanner 18 at position P2, a reading of (X2,Y2,S2) is obtained and with the scanner 18 at position P3, a reading of (X3,Y3,S3) is obtained.

Each series of readings, i.e., the readings obtained from each individual beacon 28, recorded by the scanner 18 may be stored in the scanner's memory. To obtain an estimated position of each beacon, the series of readings relating only to that beacon is input to a calculation algorithm 30 that processes the readings to provide as output, an estimated position of the beacon 28 (see FIG. 4). If multiple series of readings are input to the algorithm, then the position of all of the beacons 28 from which readings were obtained will be output.

Figure 4:
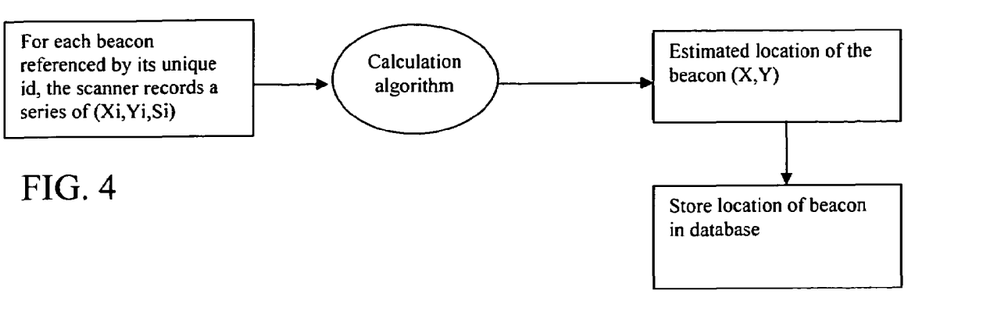
FIG. 4 is a flowchart showing the mapping of wireless beacons from the scanner readings.

Note that at each position of the scanner 18, multiple readings can be obtained, one for each beacon 28 in reception range of the scanner 18. These readings can be stored with an identification of the beacon 28 so that the readings can later be combined with other readings from the same beacon 28 in order to determine the location of the beacon 28.

Different calculation algorithms 30 can be used in the invention to process each series of readings into the position of the beacon 28. These include Centroid, triangulation, Newton and the like. An exemplifying calculation algorithm 30, namely the Centroid algorithm, is described below. Generally, regardless of which algorithm 30 is used, approximately the same estimated position of the beacon 28 will be obtained and thus, the invention is not limited to use of any particular algorithm.

It is important to bear in mind that scanner 18 can be and typically is the same as computing device 10 (in which case, GPS device 20 is the same as GPS device 12, the software 22 and database 26 would be part of the wireless positioning system 14 and antenna 24 would be part of the wireless computing device 10). This embodiment will be considered hereinafter. In this case, computing device 10 would not only create and/or update the database 26 of wireless beacons in the wireless positioning system 14 via operation of the scanning software 22 (when GPS signals from GPS device 12, 20 are available) but would also use the same database 26 of wireless beacons it is updating to determine its position in the absence of an accurate GPS signal from the GPS device 12, 20 (when GPS signals from GPS device 12, 20 are not available). Thus, when GPS signals are available and switch 16 is allowing the GPS signal from the GPS device 12, 20 to be directed to the computing device 10, computing device 10 is working as scanner 18 to scan the area around the computing device 10 to determine the presence of (unmapped) wireless beacons and obtain geographic positional information about these unmapped wireless beacons for inclusion in the database 26 of wireless beacons resident in the wireless positioning system 14.

After the estimated position of the beacons is obtained, the final step in creating the database 26 of wireless beacons in wireless positioning system 14 is to store the positions of the beacons 28 in a database in a manner in which the position of the beacon is associated with an identification code. For example, the position of each beacon 28 can be stored in the database 26 in the form (Id, X, Y) where Id is a unique identification associated with or referencing the beacon 28 and X, Y are the latitude and longitude coordinates, respectively, of the beacon 28 as determined in the manner described above.

The database creation step continues whenever a GPS signal is available and the position of the scanner 18 has changed. Thus, when the scanner 18 is the same as computing device 10, movement of the computing device 10 in the presence of a GPS signal from GPS device 12, 20 can results in continuous updating of the database 26 of wireless beacons in wireless positioning system 14.

In the exemplifying use described above with respect to FIG. 1, the database 26 of wireless beacons in wireless positioning system 14 is used only when a GPS signal from GPS device 12, 20 is unavailable. At this time, it is necessary to input data into the database 26 to determine the position of the computing device 10.

Figure 5:
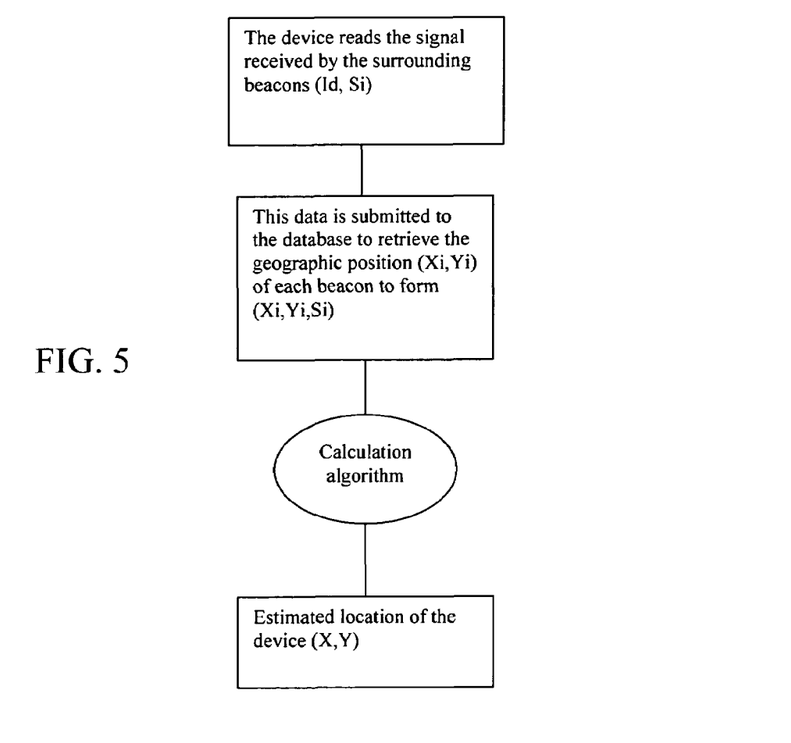
FIG. 5 is a flowchart showing the determination of the position of a computing device based on instantaneously received signals from wireless beacons and the database thereof.

With reference to FIG. 5, determining the position of the computing device 10 using the database 26 of wireless beacons in wireless positioning system 14 entails querying a receiver unit of the computing device 10, i.e., a network adapter or cell antenna 24, to find out which wireless beacon (s) 28 are "visible" and what is the strength of the signal received by the receiver from each wireless beacon 28. Visible beacons 28 are those from which the receiver receives a signal.

From the antenna 24, the computing device 10 will obtain a series of readings each containing the unique identification associated with or referencing one of visible wireless beacons 28 and the strength of the signal from that wireless beacon 28. This series of readings can be expressed in the form of (Id, Si) where Id is the unique identification of the wireless beacon 28 and Si is the signal strength.

The computing device 10 then submits this information to database 26 in wireless positioning system 14 which contains the geographic location of the wireless beacons 28 in association with their identification. Using the data contained in the database 26, the corresponding, estimated geographic location of the wireless beacon 28 is obtained based on its identification contained in the information and is associated with the signal strength.

After the location of the visible beacon(s) 28 associated with the antenna 24 is known, a series of (Xi, Yi, Si) records is provided to the calculation algorithm 30 to estimate the position of the antenna 24, i.e., the position of the computing device 10.

As described above, a calculation algorithm 30 is used to determine the position of a wireless beacon 28 when creating the database 26 of wireless beacons and also to determine the position of the computing device 10 in the absence of a GPS signal from GPS device 12, 20.

When determining the position of a wireless beacon 28 in the mapping mode from the series of readings (Xi,Yi,Si) to determine the position (X,Y) of the wireless beacon 28, the Centroid calculating algorithm averages the latitudes and longitudes recorded and adds the signal strength squared as a weight:

$$X=(S1^2*X1+S2^2*X2+\ldots+Sn^2*X2)/(S1^2+S12^2+\ldots+Sn^2)$$

$$Y=(S1^2*Y1+S2^2*Y2+\ldots+Sn^2*Y2)/(S1^2+S12^2+\ldots+Sn^2)$$

where X and Y are the estimated position of the beacon 28 and the Si, Xi, Yi the information recorded by the scanner 18.

When estimating the position of the computing device 10 using the same formula, Xi, Yi would be the coordinates of the wireless beacons 28 referenced in the database 26 and Si would be the strength of the signal received from those same wireless beacons 28.

Applying the database mapping technique described above using scanner 18, when incorporated into the wireless computing device 10 with a common GPS device 12, it becomes possible to create a collaborative database. That is, a database which is continually being updated with data about new wireless beacons can be formed. Scanner 18 obtains identification and signal strength data about new, unmapped wireless beacons when the GPS device 12 receives accurate positioning signals and determines the position of the unmapped wireless beacons for inclusion in the database of wireless beacons in the wireless positioning system 14 which is used when accurate GPS signals from GPS device are not available. The same positional information about previously unmapped wireless beacons being directed to the database in the wireless positioning system 14 can also be directed to a central monitoring or administration facility which is charged with the responsibility for providing an accurate database of wireless beacons. The positional information can be forwarded to this facility periodically, such as every 24 hours. In conjunction with an upload of positional information about new wireless beacons, positional information about new wireless beacons obtained from other wireless computing devices 10 can be downloaded from the facility.

The central facility thereby oversees collection of individual contributions to the database, one from each participating (collective) wireless computing device, and disseminates the collection of the individual contributions to all wireless computing devices using the same positioning technique. It must be understood that not all wireless computing devices 10 will be equipped with a scanner 18 in which case, only some wireless computing devices would contribute positional information to the central facility but all wireless computing devices would preferably receive the update of positional information. Since the uploading of the positional information from the wireless computing devices to the central facility and downloading of the positional information from the central facility to the wireless computing devices may be done without involvement of the user, the central and individual databases of wireless beacons can therefore be passively created, updated and disseminated.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A system for enabling a wireless computing device to determine its location both when communicating with one or more satellites of a wireless positioning network and when unable to communicate with any satellites of the wireless positioning network, comprising:

a wireless computing device; and a wireless positioning system substantially collocated with said wireless computing device, said wireless positioning system having a first positioning mode in which it communicates with the one or more satellites of the wireless positioning network to enable the geographic location of said wireless computing device to be determined upon reception of signals from only the one or more satellites of the wireless positioning network and a second positioning mode in which it enables the geographic location of said wireless computing device to be determined upon reception of signals from at least one non-satellite wireless beacon and analysis of the signals in light of positional information about wireless beacons contained in a database and said wireless positioning system being affanged to switch between said first and second positioning modes to obtain a determination of its geographic location depending on reception of signals from the one or more satellites of the wireless positioning network, when in said first positioning mode and communicating with the one or more satellites of the wireless positioning network, said wireless computing device being arranged to     obtain its geographic location based on reception of signals only from the one or more satellites of the wireless positioning network and also     obtain identification and signal strength information about non-satellite wireless beacons and also     derive positional information about at least one of these wireless beacons, for which identification and signal strength information has been obtained but for which positional information is not present in said database, from both the obtained geographic location of said wireless computing device and the obtained identification and signal strength information about the non-satellite wireless beacons, the derived positional information then being included in said database, and when in said second positioning mode and unable to communicate with the one or more satellites of the wireless positioning network, said wireless computing device being arranged to determine its geographic location based on reception of signals from at least one non-satellite wireless beacon whose positional information is included in said database and analysis of the signals in light of positional information about wireless beacons contained in said database and from which signals have been received.

2. The system of claim 1, wherein said wireless positioning system switches from said first positioning mode to said second positioning mode when signals from the wireless positioning network are not deemed sufficiently accurate or are unavailable, and from said second positioning mode to said first positioning mode when signals from the wireless positioning network are available and deemed accurate.

3. The system of claim 1, wherein said wireless positioning system is affanged in said wireless computing device.

4. The system of claim 1, wherein said wireless positioning system includes a software-implemented switch to switch between said first and second positioning modes.

5. The system of claim 1, wherein said wireless positioning system includes a GPS system which communicates with a satellite-based GPS positioning system to provide said first positioning mode.

6. The system of claim 1, wherein said wireless positioning system includes a calculation algorithm which determines the geographic location of said wireless computing device in said second positioning mode upon input of identification and signal strength information about the at least one wireless beacon derived from the received signals.

7. The system of claim 1, wherein said wireless computing device includes a scanner affanged to communicate with the one or more satellites of the wireless positioning network when said wireless computing device is in said first positioning mode to enable its geographic location to be determined upon reception of signals from only the one or more satellites of the wireless positioning network, said scanner being affanged to obtain positional information about itself and identification and signal strength information about non-satellite wireless beacons, whose positional information is not present in said database, in order to derive positional information about at least one such identified wireless beacon from the positional information about itself and the signal strength information to enable the derived positional information to be included in said database.

8. The system of claim 7, wherein said scanner is arranged to analyze strength of signals received from the wireless beacons at a plurality of different positions of said scanner and apply an algorithm to determine the positional information about the wireless beacons therefrom.

9. The system of claim 7, wherein said scanner is arranged to obtain identification and signal strength information about the wireless beacons, whose positional information is not present in said database, at a plurality of different locations and derive positional information for each identified wireless beacon from the signal strength information at the plurality of different locations.

10. The system of claim 1, wherein said database, which includes the derived positional information about the at least one wireless beacon, is arranged within said wireless computing device.

11. The system of claim 1, wherein said wireless computing device is a PDA or cell phone.

12. A method for enabling a wireless computing device to determine its location both when communicating with one or more satellites of a wireless positioning network and when unable to communicate with any satellites of the wireless positioning network, comprising:

coupling the wireless computing device to the wireless positioning network;

enabling the geographic location of the wireless computing device to be determined upon reception of signals from only the one or more satellites of the wireless positioning network;

creating a database of identification and positional information about non-satellite wireless beacons;

updating the database of identification and positional information about wireless beacons, when the wireless computing device obtains signals from the one or more satellites of the wireless positioning network and determines its geographic location based only on signals therefrom, by         obtaining identification and signal strength information about non-satellite wireless beacons and         deriving positional information about at least one of these wireless beacons, for which identification and signal strength information has been obtained but for which positional information is not present in the database, from the geographic location of the wireless computing device as determined by the wireless computing device and identification and signal strength information obtained b the wireless computing device;

including the derived positional information about the at least one of the wireless beacons in the database; and     when the wireless computing device does not receive usable signals from the one or more satellites of the wireless positioning network to enable it to determine its geographic location based thereon, determining the geographic location of the wireless computing device from reception of signals from at least one non-satellite wireless beacon whose derived positional information is included in the database and analysis of the received signals in light of the positional information about wireless beacons contained in the updated database and from which signals have been received.

13. The method of claim 12, wherein the step of coupling the wireless computing device to the wireless positioning network comprising arranging a GPS device in the wireless computing device.

14. The method of claim 12, wherein the step of updating the database comprises obtaining identification and signal strength data about each wireless beacon at a plurality of locations at which a signal from that wireless beacon is being received and applying an algorithm to determine positional information about the wireless beacons based on the signal strength data.

15. A method for administering a database of wireless beacons, comprising:
   maintaining a central database of wireless beacons;
   wirelessly coupling the central database to a plurality of wireless computing devices;
   enabling each wireless computing device to determine identification and positional information about wireless beacons not contained in the central database without communicating with the central database;
   periodically forwarding the identification and positional information about wireless beacons not contained in the central database from the wireless computing devices to the central database;
   updating the central database to include the forwarded identification and positional information; and
   periodically directing the updates of the central database to the plurality of wireless computing devices.

16. The method of claim 15, wherein the step of enabling each wireless computing device to determine identification and positional information about wireless beacons comprises:
   obtaining identification and signal strength data about each wireless beacon at a plurality of locations at which a signal from that wireless beacon is being received;
   applying an algorithm to determine positional information about the wireless beacons based on the signal strength data; and
   storing the positional information in association with the identification data.

17. A system for enabling a wireless computing device to determine its position, comprising:
   a central database containing identification and positional information about wireless beacons, said central database being arranged to receive identification and positional information about wireless beacons not previously contained therein and generate database updates based thereon;
   a wireless computing device including a local database containing positional information about wireless beacons, said wireless computing device being affanged to wirelessly communicate with said central database to receive said database updates and add said database updates to said local database, said wireless computing device being arranged to determine identification and positional information about wireless beacons, whose positional information is not contained in said central database or said local database, without communicating with said central database and to include the identification and positional information about such wireless beacons in said local database; and
   a wireless positioning system substantially collocated with said wireless computing device, said wireless positioning system being arranged to enable the geographic location of said wireless computing device to be determined upon reception of signals from at least one wireless beacon and analysis of the signals in light of the positional information about wireless beacons contained in said local database.

18. The system of claim 17, wherein said wireless positioning system includes a calculation algorithm which determines the geographic location of said wireless computing device upon input of identification and signal strength information about the at least one wireless beacon derived from the received signals.

19. The system of claim 17, wherein said wireless positioning system is arranged in said wireless computing device.

20. The method of claim 12, wherein the database of identification and positional information about wireless beacons, whose positional information is not already present in the database, is built by obtaining identification and signal strength information about such wireless beacons and deriving positional information for each identified wireless beacon from the signal strength information.

21. The system of claim 1, wherein said wireless positioning system includes a calculation algorithm which determines the geographic location of said wireless computing device in said second positioning mode upon input of identification and signal strength information received from a plurality of wireless beacons.

22. The system of claim 1, wherein said wireless computing device is arranged to derive positional information about the at least one wireless beacon, for which identification and signal strength information has been obtained but for which positional information is not present in said database, from the geographic location of said wireless computing device and identification and signal strength information obtained when said wireless computing device is at multiple and different locations.

23. The system of claim 1, wherein said wireless computing device is a Wi-Fi device.

24. The method of claim 12, further comprising locating the database in the wireless computing device.

25. The method of claim 12, wherein the wireless computing device is a Wi-Fi device.

26. The system of claim 1, wherein the at least one non-satellite wireless beacon is a fixed beacon.

27. The system of claim 1, wherein the at least one non-satellite wireless beacon is part of a network of beacons arranged to receive telecommunication signals addressed to a plurality of wireless computing devices and relay the telecommunication signals to another beacon or to a specific one of the wireless computing devices depending on the telecommunication signal.

* * * * *

UNITED STATES PATENT AND TRADEMARK OFFICE
CERTIFICATE OF CORRECTION

PATENT NO. : 7,397,424 B2  Page 1 of 1
APPLICATION NO. : 11/170337
DATED : July 8, 2008
INVENTOR(S) : Cyril Houri It is certified that error appears in the above-identified patent and that said Letters Patent is hereby corrected as shown below:

Column 9, line 5, replace "affanged" with --arranged--.

Column 9, line 46, replace "affanged" with --arranged--.

Column 9, line 61, replace "affanged" with --arranged--.

Column 9, line 67, replace "affanged" with --arranged--.

Column 11, line 53, replace "affanged" with --arranged--.

Signed and Sealed this

Twenty-sixth Day of August, 2008

JON W. DUDAS
*Director of the United States Patent and Trademark Office*